UNITED STATES PATENT OFFICE.

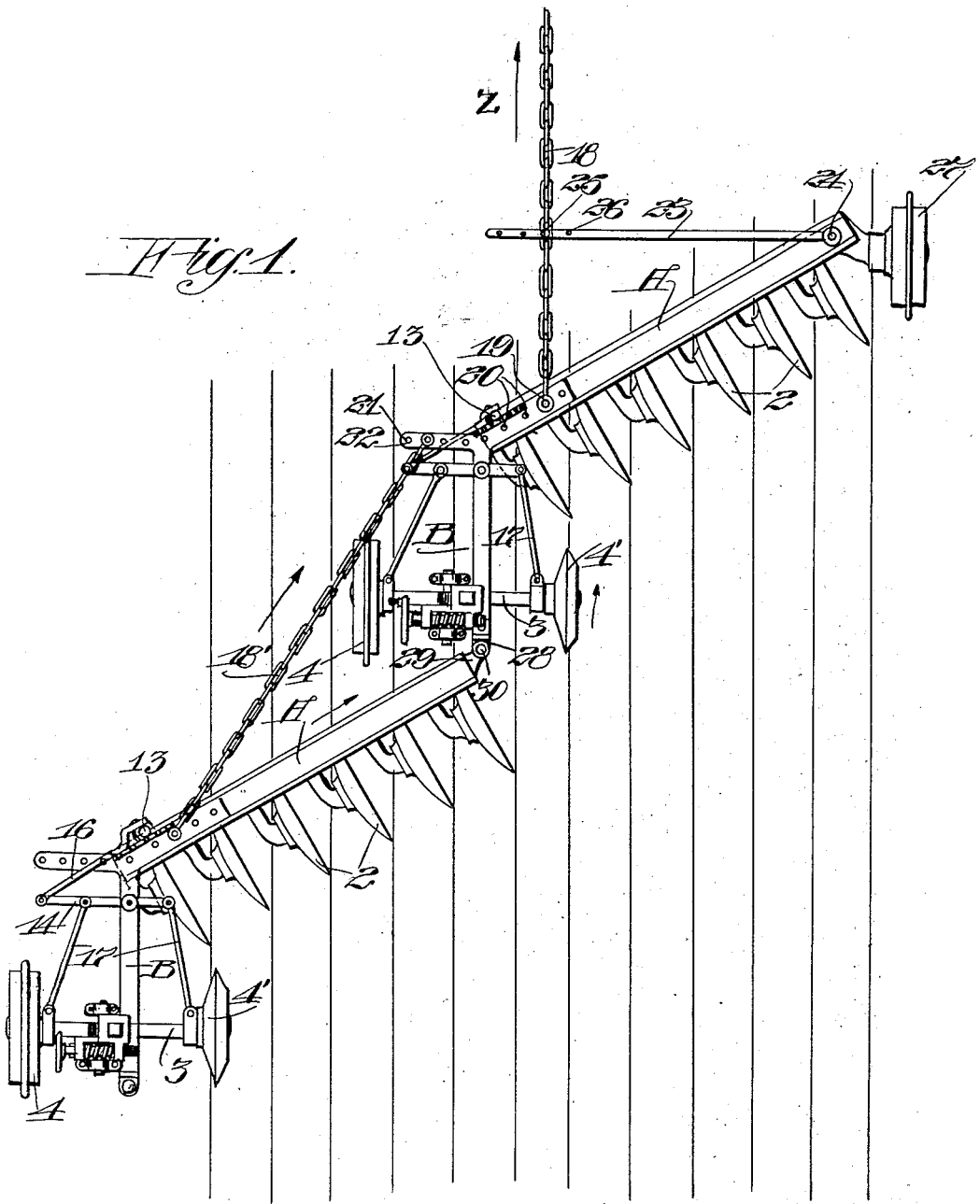

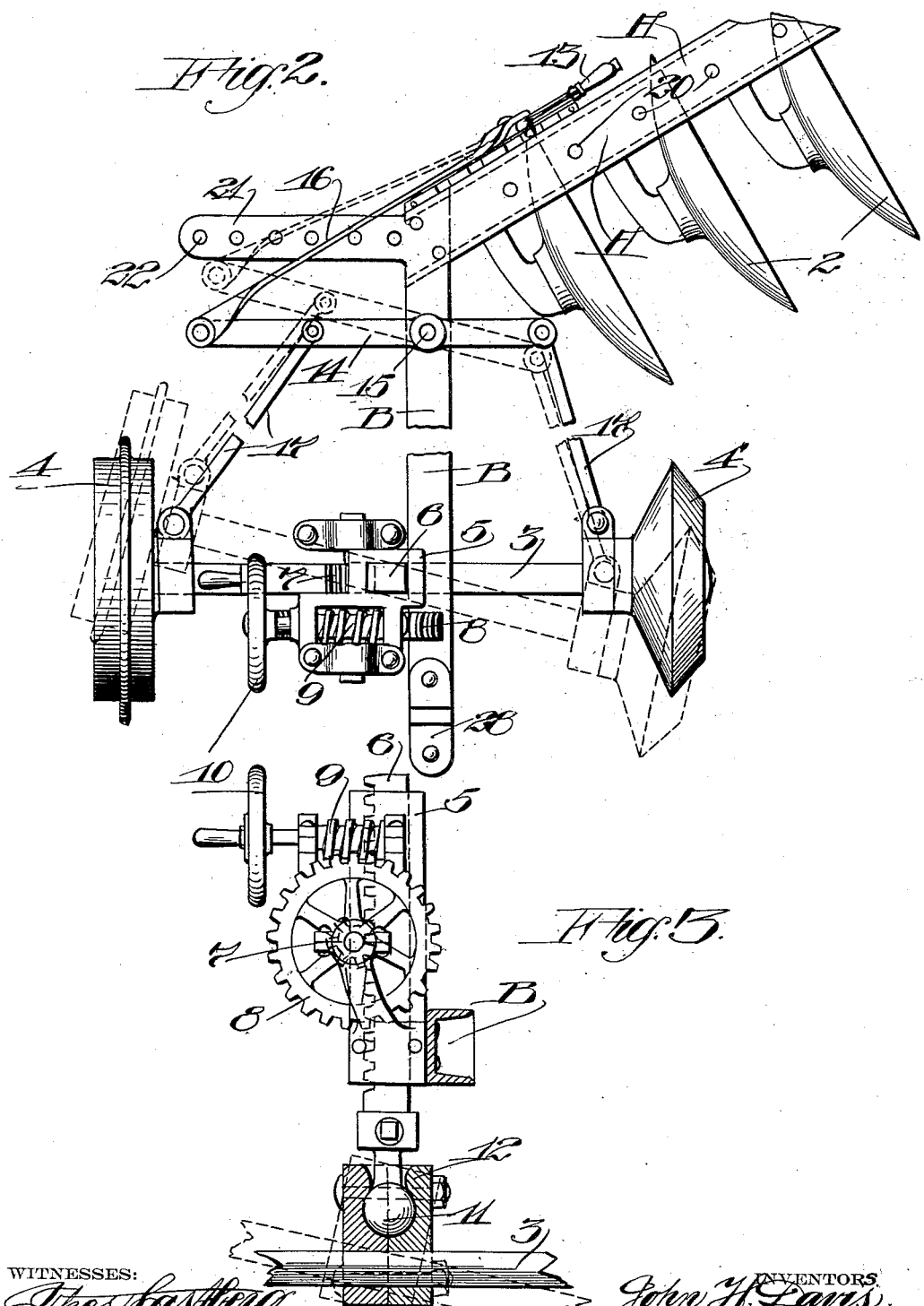

JOHN H. DAVIS AND JOHN W. MORGAN, OF STOCKTON, CALIFORNIA; SAID MORGAN ASSIGNOR TO SAID DAVIS.

DRAFT CONNECTION AND CONTROL FOR GANG DISK PLOWS.

1,257,281. Specification of Letters Patent. Patented Feb. 19, 1918.

Application filed October 12, 1912. Serial No. 725,540.

*To all whom it may concern:*

Be it known that we, JOHN H. DAVIS and JOHN W. MORGAN, citizens of the United States, residing at Stockton, in the county of San Joaquin and State of California, have invented new and useful Improvements in Draft Connections and Controls for Gang Disk Plows, of which the following is a specification.

This invention relates to disk plows and particularly pertains to a draft and steering gear therefor. It is the object of this invention to provide a disk plow which is especially adapted to be employed in gangs of two or more plows and to provide a draft and steering-gear therefor by means of which any suitable number of plows can be hauled by a single draft connection, with the traction means and the gangs controlled from the rearmost plow. Another object is to provide a draft-gear for a succession of gangs, and which is so arranged that each succeeding gang will be drawn by a single draft connection or chain from the gang immediately in advance thereof, as distinguished from the usual method of connecting the several gangs independently of a long draft bar. Another object is to so construct the plow frames for each gang that a number of gangs can be quickly connected together, which gangs are designed to be arranged in such relation to one another that the haul upon one gang will tend to crowd the gang in advance thereof toward the plowed ground in opposition to the tendency of the plows to run to land or toward the unplowed ground.

The invention primarily resides in an angular plow-frame, the forward portion of which carries the plow-disks and the rearward portion of which is supported on a steering truck, means for steering the truck, means for raising and lowering the plow-frame in relation to the steering truck, means for connecting the forward end of one frame to the rearward end of another, and an adjustable draft connection between adjacent plow-frames so arranged that when a pull is exerted thereon and communicated to the plow-frame, the latter will bear against the plow-frame in front thereof and crowd it to one side.

The invention consists of the parts and the construction and combination of parts as hereinafter more fully described and claimed, having reference to the accompanying drawings, in which—

Figure 1 is a plan view of a gang plow constructed in accordance with this invention.

Fig. 2 is a detail plan view of the steering truck.

Fig. 3 is a detail elevation, partly in section, of the mechanism for raising and lowering the plow-frame in relation to the steering truck.

In the drawings the plow-frame is shown as formed of two horizontal members A and B, disposed at an angle of approximately 120° in relation to each other, which members may be constructed in one piece or of separate pieces, rigidly bolted together.

The forward member A carries a series of disk-plows 2, of any suitable description, on its underside, in the manner common in disk-plows; the disks 2 being disposed at right angles to the frame member A, and at an angle to the path of travel of the plow-frame. The plow-frame with its set of plows constitutes a gang or what is termed a disk gang plow.

The member B extends in the direction of travel the plow-frame and is supported at its outer end on an axle 3 and wheels 4—4' thereon, in the following manner: Mounted on the member B is a vertically extending guide post 5, in which a bar 6 is reciprocably mounted, and which bar is formed with rack teeth on one of its vertical edges. A pinion 7 on a shaft carrying a gear 8, meshes with the rack teeth on the bar 6, and a worm-gear 9 on a shaft carrying a crank-wheel 10, meshes with the gear 8, in such manner that when the crank-wheel 10 is rotated the bar 6 will be caused to move up or down in the guide post 5. Formed on the lower end of the bar 6 is a ball 11 which is inclosed in a socket 12 carried on the axle 3; the ball 11 and socket 12 forming a universal joint between the axle 3 and the frame B, which joint will admit of the axle 3 rocking in vertical direction, as indicated in dotted lines in Fig. 3, and in a horizontal direction as indicated in dotted lines in Fig. 2. The vertical oscillating movement of the axle 3, permitted by the ball and socket joint, admits of the truck assuming various angles, due to unevenness of the ground, particularly when the wheel 4' is traveling in the furrow cut by the rearmost disk 2.

The part B, axle 3 and wheels 4—4', constitute what we term a truck to support the rear end of the gang frame or plow-frame A.

The horizontal movement of the axle 3 takes place in steering or directing the plow, and is accomplished by means of a hand lever 13 connected to a bar 14 pivotally mounted at 15 on the member B of the plow-frame, by means of a connecting rod 16. Attached to the bar 14 on the opposite side of the pivotal point 15 thereof, are connecting rods 17 which are attached to the outer ends of the axle 3 in such manner that when the rod 14 is rocked by means of the lever 13, the axle 3 will be caused to move in a horizontal direction.

An important feature of this invention resides in the draft-gear through which the plow is hauled. This draft-gear is here shown as consisting of a chain 18 which is connected to the portion A of the plow-frame by means of a clevis 19 at a point adjacent the junction of the members A and B; a series of perforations 20 being formed in the member A to receive the clevis pin and permit of the draft-chain 18 being attached to the plow-frame A at various points.

Where the plows are to be employed in a series of gangs, the draft-chain 18 on the forward gang connects with the traction engine, or other hauling power, while the draft-chain 18' on each succeeding gang is connected at its outer end to an arm 21 formed on the preceding plow-frame at the juncture of the members A and B, and extending outwardly at right angles to the latter. In the present case I have shown two gangs connected together; the front gang being designed to be connected to the traction engine by the chain 18.

The arm 21 is formed with a series of perforations 22 to receive the pin of a clevis attached to the outer end of the chain 18'; the series of perforations being provided so that the draft may be adjusted at this point.

The foremost plow-frame is provided with a distance bar for regulating the draft of the forward plow. This distance bar is indicated at 23 and is shown as pivotally connected at 24 to the forward end of the member A, and is connected to the draft chain 18' by means of a pin 25, inserted through one of a series of perforations 26 formed in the distance bar 23, adjacent its outer end. The draft of the forward plow-frame may be adjusted by connecting the distance bar to the chain 18 at different points. The forward end of the foremost plow-frame is supported upon a furrow wheel 27, of any suitable description, while the forward ends of the succeeding plow-frames are supported by the rear end of the plow-frame, truck 3—4—B, immediately in advance thereof.

The connection between the adjacent plow-frame is here shown as consisting of yokes 28 and 29 formed on the members B and A, respectively, and connected together by means of a pin 30. By this construction the weight of the rearward plow will be supported upon the trucks of the plow-frame in advance thereof. It is manifest that any suitable coupling may be employed between the adjacent plows.

The draft of the foremost gang is regulated by means of the adjustable distance bar 23, while the draft on the rearward gangs is adjusted by connecting the chain 18' to different points on the member A or the arm 21 of the gang frame immediately in front.

When a pull is exerted upon the chain 18' connecting the forward gang and the one immediately therebehind, the direction of the pull upon the plow-frame through the chain 18' will be such as to cause the forward end of the rearward plow-frame A to crowd against the rear end of the plow-frame B on the forward plow-frame, in such manner as to tend to maintain the several gangs in proper alinement. The connection between the plow-frames is designed to be such that there will be no pull upon the rear gang through the plow-frames other than that exerted through the draft-chain 18'.

In steering the plows, the operator employs the lever 13 on the rearmost gang. By directing the rearmost gang, the direction of the push of the forward end of this gang upon the gang immediately in advance thereof, will be varied, tending to crowd the forward gangs toward the plowed ground when necessary; the plows naturally moving toward the land when the rear trucks are turned in that direction by reason of the tendency of the disk plows 2 to climb.

Normally, this tendency may be overcome by adjusting the draft chains 18'; these chains being taken up or let out as occasion may require.

It will be observed by reference to Fig. 1, in which the direction of forces are indicated by arrows, that the pull upon the forward hauling chain 18 is in the direction of the path of travel of the plow, which path of travel is denoted by the arrow Z. Now if a single gang was used, the tendency of the plows of that gang to travel toward the land would have to be overcome by setting the steering wheels 4—4' at an angle toward the plowed ground, but where two or more gangs are employed and are connected together by means of the chains 18', this setting of the steering wheels at an angle to the path of travel is unnecessary. This is occasioned by reason of the pull on the rearward plows being exerted in a direction at an angle to the path of travel thereof and in opposition to the tendency of the plows to move inland. By connecting the adjacent plow-frames together, each gang will crowd against the plow-frame immediately in advance thereof, and thereby overcome the inland movement of the plows; the resistance offered by the preceding gangs limiting the crowding action of the gang therebehind, thereby retaining the several gangs in proper alinement.

No claim for the tandem arrangement is made in this application, as that forms the subject-matter of a subsequent application filed May 12, 1913, Serial Number 766,990.

Having thus described our invention, what we claim and desire to secure by Letters Patent, is—

1. In combination with the frame of a gang plow and a trailing truck for supporting the rear end thereof, means connected to the frame and truck to allow the latter to oscillate vertically and be horizontally adjusted, means to raise or lower the frame relative to the truck, and manually controlled means connected to the truck and frame for adjusting the angle of the truck horizontally with relation to the plow frame at will and maintaining the same in any horizontal position to which it may be adjusted while still permitting free vertical oscillation.

2. In combination with the frame of a gang plow and a trailing truck for supporting the rear end thereof, means connected to the frame and truck to allow the latter to oscillate vertically and be horizontally adjusted, means to raise or lower the frame relative to the truck, and means to enable selective horizontal oscillation of the truck and to positively lock the truck in any angular position horizontally relative to the frame while still permitting free vertical oscillation.

3. In a disk plow, a one-way disk gang arranged obliquely to the line of draft, a trailing truck connected to the rear end thereof, so as to be capable of horizontal oscillation, means to raise and lower the gang relative to the truck, and means for manually controlling the truck oscillations and for holding the truck in any position to which it may be oscillated.

4. In combination with the frame of a gang plow and a trailing truck, including an axle supporting the rear end thereof, a rack slidably connected to the plow frame, a universal joint between the rack and truck, a pinion in mesh with the rack, means to rotate the pinion, a lever pivoted to the plow frame, connecting rods between the lever ends and the truck axle, a hand lever connected to the first named lever for shifting the latter and through the rods the truck axle, and means to lock the hand lever in any position to which it may be moved thereby to lock the truck axle against horizontal movement while still permitting free vertical oscillations thereof.

5. In combination with the frame of a gang plow and a trailing truck including an axle, means connecting the truck axle to the plow frame for horizontal oscillation, means to raise and lower the frame relative to the truck axle, a lever pivoted to the frame, rods connecting the lever ends and the truck axle, a hand lever connected to the first named lever for shifting the latter and through the rods the truck axle, and means to lock the hand lever in any position to which it may be moved.

In testimony whereof we have hereunto set our hands in the presence of two subscribing witnesses.

JOHN H. DAVIS.
JOHN W. MORGAN.

Witnesses as to John H. Davis:
  HERMAN W. MELROSE,
  WILLIAM W. HUSSONG.

Witnesses as to John W. Morgan:
  P. VISHER,
  GEO. L. WOLF.